(12) United States Patent
Desmond et al.

(10) Patent No.: US 12,495,010 B2
(45) Date of Patent: Dec. 9, 2025

(54) MODERATING ARTIFICIAL INTELLIGENCE (AI) AGENT INTERLOCUTION IN GROUP DIALOG ENVIRONMENTS

(71) Applicant: INTERNATIONAL BUSINESS MACHINES CORPORATION, Armonk, NY (US)

(72) Inventors: Michael Desmond, White Plains, NY (US); Zahra Ashktorab, Brooklyn, NY (US); Michelle Brachman, Quincy, MA (US); James Johnson, Somerville, MA (US); Casey Dugan, Cambridge, MA (US); Qian Pan, Canton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 18/192,262

(22) Filed: Mar. 29, 2023

(65) Prior Publication Data
US 2024/0333666 A1  Oct. 3, 2024

(51) Int. Cl.
*H04L 51/02* (2022.01)
*G06F 40/20* (2020.01)

(52) U.S. Cl.
CPC ............ *H04L 51/02* (2013.01); *G06F 40/20* (2020.01)

(58) Field of Classification Search
CPC ........... H04L 51/02; G06F 40/20; G06F 40/35
See application file for complete search history.

(56) References Cited

U.S. PATENT DOCUMENTS

| | | |
|---|---|---|
| 8,037,147 B1 | 10/2011 | Herold et al. |
| 10,366,168 B2 | 7/2019 | Wu |
| 10,750,019 B1 * | 8/2020 | Petrovykh ............... H04L 51/02 |
| 10,834,026 B2 | 11/2020 | Nagaraja et al. |
| 11,176,927 B2 | 11/2021 | Langen |
| 11,271,830 B2 | 3/2022 | Murugan |
| 11,431,660 B1 | 8/2022 | Leeds et al. |
| 11,507,756 B2 | 11/2022 | Lima et al. |

(Continued)

FOREIGN PATENT DOCUMENTS

CN  109873752 A  6/2019

OTHER PUBLICATIONS

US 11,438,185 B2, 09/2022, Vuskovic et al. (withdrawn)

(Continued)

*Primary Examiner* — Athar N Pasha
(74) *Attorney, Agent, or Firm* — KONRAD, RAYNES, DAVDA & VICTOR LLP; Janaki K. Davda

(57) ABSTRACT

Provided are techniques for moderating Artificial Intelligence (AI) agent interlocution in group dialog environments. Under control of an interlocution module that has been trained with dialog content and dialog turns, an indication that interlocution is to be determined for a group dialog is received. Under control of the interlocution module, it is determined whether an AI agent is to participate in the group dialog based on a current dialog context and a dialog response. Under control of the interlocution module, in response to determining that the AI agent is to participate in the group dialog, the AI agent is triggered to post the dialog response to the group dialog.

18 Claims, 12 Drawing Sheets

(56) References Cited

U.S. PATENT DOCUMENTS

| | | | |
|---|---|---|---|
| 2009/0030992 A1* | 1/2009 | Callanan | G06Q 10/107 709/206 |
| 2018/0218305 A1* | 8/2018 | Shah | G06F 21/44 |
| 2020/0357403 A1* | 11/2020 | Chen | G10L 13/033 |
| 2023/0008822 A1* | 1/2023 | Serban | H04M 3/493 |
| 2023/0401380 A1* | 12/2023 | Gupta | G06Q 30/0201 |

OTHER PUBLICATIONS

Shuster, Kurt, et al. "Blenderbot 3: a deployed conversational agent that continually learns to responsibly engage." arXiv preprint arXiv:2208.03188 (2022) (Year: 2022).*

J.M. Makokha, "Enhancing Human-AI (H-AI) Collaboration On Design Tasks Using An Interactive Text/Voice Artificial Intelligence (AI) Agent", In Proceedings of the 2022 International Conference on Advanced Visual Interfaces (AVI 2022). Association for Computing Machinery, New York, NY, USA, Article 53, 1-4. (https://doi.org/10.1145/3531073.3534478).

Kim, et al., "Bot in the Bunch: Facilitating Group Chat Discussion by Improving Efficiency and Participation with a Chatbot," In Proceedings of the 2020 CHI Conference on Human Factors in Computing Systems, 14 pp. (Apr. 2020).

Li, e al., "ALOHA: Artificial Learning of Human Attributes for Dialogue Agents", In Proceedings of the AAAI Conference on Artificial Intelligence (vol. 34, No. 05, pp. 8155-8163), Apr. 2020, 10 pp.

Vassilakopoulou, et al., "Developing human/AI interactions for chat-based customer services: lessons learned from the Norwegian government", European Journal of Information Systems, Jul. 2022, 15 pp. (10.1080/0960085X.2022.2096490).

Amershi, et al., "Guidelines for Human-AI Interaction", In Proceedings of the 2019 CHI Conference on Human Factors in Computing Systems. Association for Computing Machinery, New York, NY, USA, Paper 3, May 4-9, 2019, 13 pp. (https://doi.org/10.1145/3290605.3300233).

Shuster, et al., "BlenderBot 3: a deployed conversational agent that continually learns to responsibly engage", arXiv:2208.03188v3, Aug. 10, 2022, 38 pp. (https://arxiv.org/abs/2208.03188).

Zheng, et al., "UX Research on Conversational Human-AI Interaction: A Literature Review of the ACM Digital Library", In CHI Conference on Human Factors in Computing Systems, Apr. 2022, 34 pp.

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

"GitHub", Wikipedia, 030623, 23 pp., [online][retreived Mar. 6, 2023] https://en.wikipedia.org/wiki/GitHub).

"Slack (software)", Wikipedia, 030623, 12 pp., [online][retreived Mar. 6, 2023] https://en.wikipedia.org/wiki/Slack_(software).

Vaswani et al., "Attention Is All You Need", arXiv:1706.03762v7 [cs.CL], Aug. 2, 2023, 15 pages.

* cited by examiner

MODERATING ARTIFICIAL INTELLIGENCE (AI) AGENT INTERLOCUTION IN GROUP DIALOG ENVIRONMENTS

BACKGROUND

Embodiments of the invention relate to moderating Artificial Intelligence (AI) agent interlocution in group dialog environments.

An AI agent may participate in a dyadic dialog in which a user (e.g., a user) and the AI agent take turns talking. However, problem solving and support activities within modern organizations commonly occur in group dialog environments. The dialogs are open and involve multiple user (e.g., human) participants.

Transitioning the conversational AI agent from operating in a dyadic dialog to operating in a group dialog is not trivial. When members of a group are discussing a problem or topic, it is not obvious if or when the AI agent is to converse in order to assist in the dialog.

SUMMARY

In accordance with certain embodiments, a computer-implemented method is provided for moderating AI agent interlocution in group dialog environments. Under control of an interlocution module that has been trained with dialog content and dialog turns, operations of the computer-implemented method receive an indication that interlocution is to be determined for a group dialog. Under control of the interlocution module, the operations of the computer-implemented method determine whether an Artificial Intelligence (AI) agent is to participate in the group dialog based on a current dialog context and a dialog response. Under control of the interlocution module, the operations of the computer-implemented method, in response to determining that the AI agent is to participate in the group dialog, trigger the AI agent to post the dialog response to the group dialog.

In accordance with other embodiments, a computer program product is provided for moderating AI agent interlocution in group dialog environments. The computer program product comprises a computer readable storage medium having program code embodied therewith, the program code executable by at least one processor to perform operations to, under control of an interlocution module that has been trained with dialog content and dialog turns, receive an indication that interlocution is to be determined for a group dialog. Under control of the interlocution module, the operations determine whether an Artificial Intelligence (AI) agent is to participate in the group dialog based on a current dialog context and a dialog response. Under control of the interlocution module, the operations, in response to determining that the AI agent is to participate in the group dialog, trigger the AI agent to post the dialog response to the group dialog.

In accordance with yet other embodiments, a computer system is provided for moderating AI agent interlocution in group dialog environments. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations to, under control of an interlocution module that has been trained with dialog content and dialog turns, receive an indication that interlocution is to be determined for a group dialog. Under control of the interlocution module, the operations determine whether an Artificial Intelligence (AI) agent is to participate in the group dialog based on a current dialog context and a dialog response. Under control of the interlocution module, the operations, in response to determining that the AI agent is to participate in the group dialog, trigger the AI agent to post the dialog response to the group dialog.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments address the issue of an AI agent or AI bot interlocution moderation in group dialogs. In particular, embodiments determine when (e.g., a particular time) an AI agent is to converse in a group dialog based on the rest of the dialog.

Figure 1:
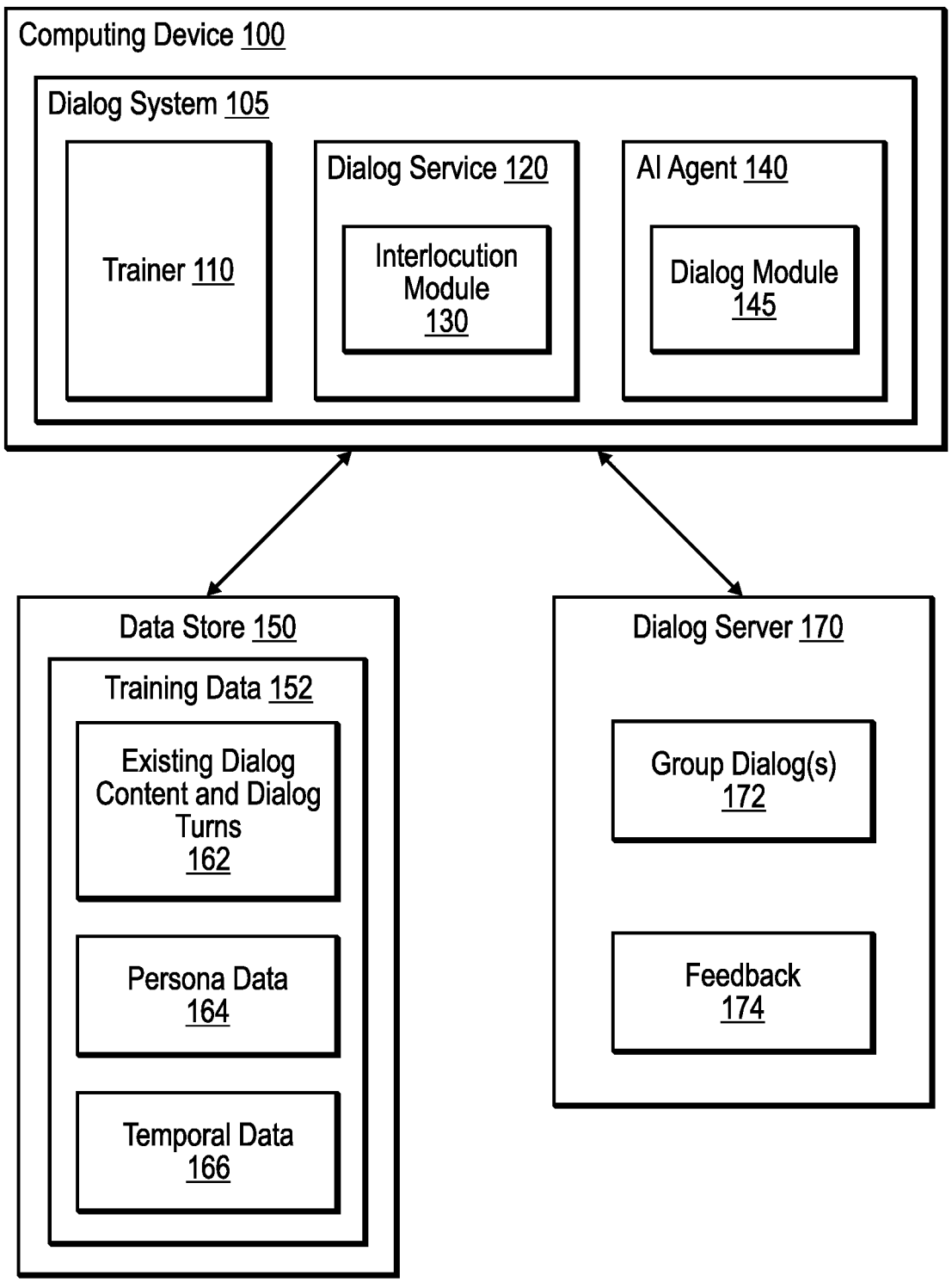
FIG. 1 illustrates, in a block diagram, a computing environment in accordance with certain embodiments.

FIG. 1 illustrates, in a block diagram, a computing environment in accordance with certain embodiments. A computing device 100 is connected to data store 150 and dialog server 170. The computing device 100 includes a dialog system 105. The dialog system 105 includes a dialog service 120 and an AI agent 140. The dialog service 120 includes an interlocution module 130. The AI agent 140 includes a dialog module 145. The data store 150 includes training data 152. In certain embodiments, the training data 152 includes one or more of: existing dialog content and dialog turns 162, persona data 164, and temporal data 166. The dialog server 170 includes one or more group dialogs 172 and feedback 174.

In certain embodiments, the interlocution module 130 monitors multiple group dialogs. In other embodiments, there may be a different interlocution module 130 assigned to each group dialog or for a subset of group dialogs. Although one AI agent is illustrated, there may be any number of AI agents, and each of the AI agents may participate in one or more group dialogs.

In certain embodiments, the interlocution module 130 is a machine learning model that is trained with dialog content and dialog turns. The interlocution module 130 mediates the AI agent 140 interlocution in group dialogs. The AI agent 140 may be described as a "bot" designed to interact in group dialog (e.g., a compliance bot). Interlocution may be described as conversing or interacting within a dialog. The interlocution module 130 mediates the AI agent 140 by determining an interlocution point (e.g., an appropriate or optimal dialog turn) for the AI agent 140 to interact with a group dialog.

In certain embodiments, the training data 152 may be described as an archive of recorded dialogs. These dialogs may include persona information related to the dialog participants and temporal data (such as timestamps). In certain embodiments, the existing dialog content and dialog turns 162 are an ordered sequence of dialog content and dialog turns, associated with (e.g., labeled by) persona and/or temporal data. The dialog content may be described as conversation, debate, lecture with questions/answers, etc. With embodiments, the persona data 164 includes salient facts associated with personas (i.e., dialog participants), where the salient facts may be extracted from a user knowledge base or may be mined from prior and/or existing dialogs. With embodiments, the temporal data 166 indicates the duration of a group dialog, the time since a last dialog response was posted to the group dialog, and an average response time.

Figure 2:
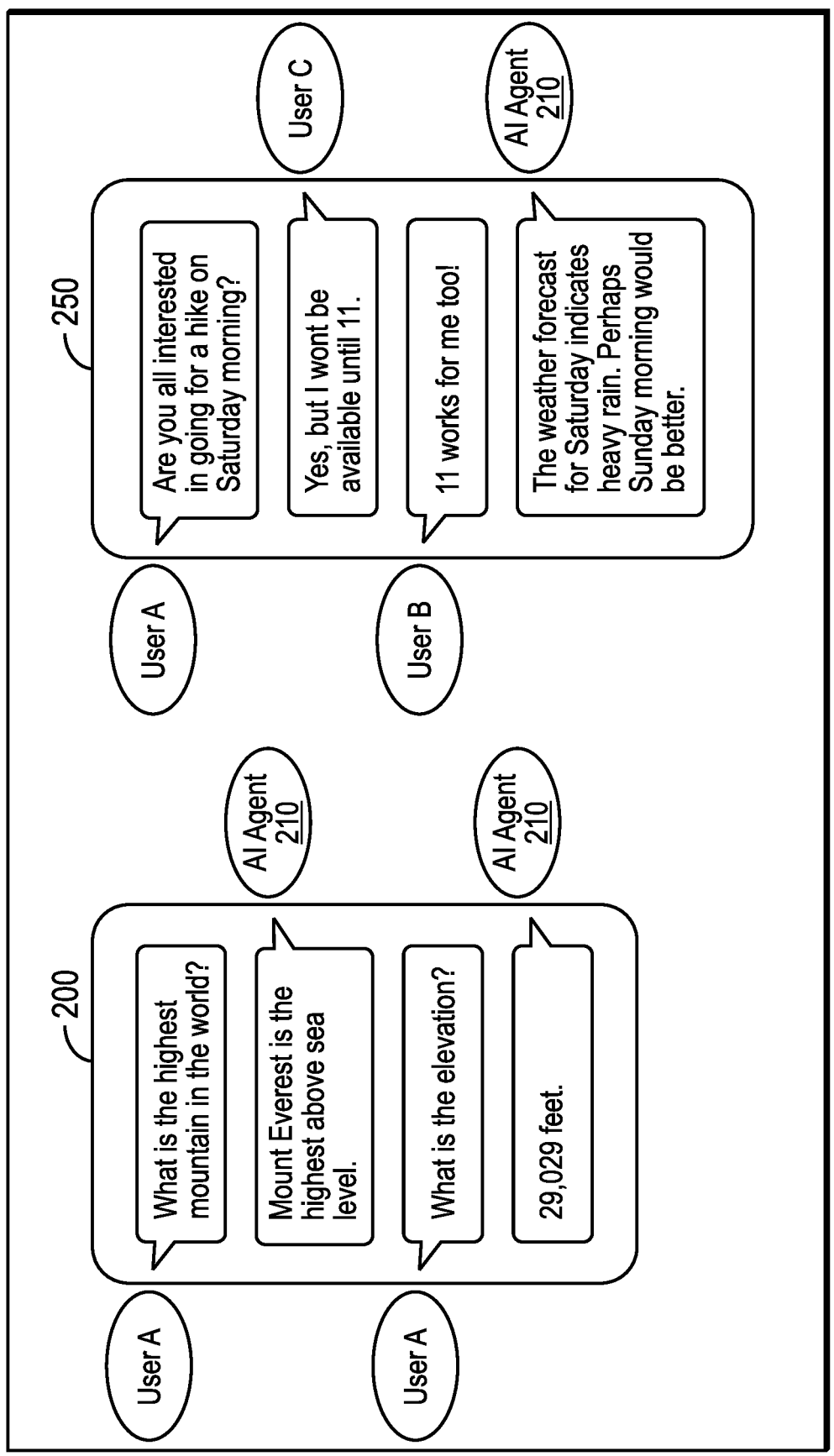
FIG. 2 illustrates dialogs in accordance with certain embodiments.

FIG. 2 illustrates dialogs in accordance with certain embodiments. For a dyadic dialog 200, the AI agent 210 takes turns speaking with User A. For a group dialog 250, the AI agent 210 determines if and when to participate in the group dialog. For example, for the group dialog 250, the AI agent 210 posts a comment after User A, User B, and User C speak.

The interlocution module 130 provides a statistical approach to determine an interlocution point representing a dialog turn in the group dialog. In certain embodiments, the interlocution module 130 applies a statistical machine learning technique (such as a neural network etc.) to predict optimal interlocution points during human to AI group dialog.

With embodiments, training data is initially collected. In certain embodiments, the training data is collected from annotated group dialog data, with the annotations indicating, for example, positive and negative interlocution points. In certain embodiments, a bootstrap model is applied to existing group dialogs, and the resulting predictions are annotated to speed development of the training set. The bootstrap model may also be referred to as a lightly trained model because the bootstrap model is trained on a small amount of data (to reduce annotation effort), but is functional enough to operate as a conduit for human feedback. That is, the dialog system 105 may be "bootstrapped" using human-human dialogs as training. In addition, crowd workers may annotate existing dialogs from the point of view of a particular participant. Then, the bootstrap model is applied to sample data.

In certain embodiments, the interlocution module 130 uses sequence to classification models or sequence to sequence models, depending on a desired level of integration with the dialog module 145. A sequence to classification model may be described as a model that receives an input of a sequence (e.g., dialog) over space or time and predicts a classification for the sequence. A sequence to sequence model may be described as a special class of Recurrent Neural Network (RNN) architectures. In certain embodiments, the interlocution module 130 is a transformer with a classification head or a transformer with a Language Model (LM) head. In certain embodiments, a transformer may be described as a neural network that learns context and meaning by tracking relationships in sequential data, such as the words in dialog.

In certain embodiments, the AI agent 140 interaction is carried out asynchronously, independent of dialog turns (e.g., an event loop is used to check dialog state periodically).

In certain embodiments, a feedback mechanism is used to continually improve the interlocution module 130. In certain embodiments, the dialog system 105 receives the feedback as positive or negative emotes on AI agent 140 messages input by other participants in a group dialog. The feedback may also be reported to the interlocution module 130 and/or the dialog service 120.

In certain embodiments, the AI agent 140 interaction is dependent on dialog response. In certain other embodiments, the AI agent 140 interaction is independent of dialog response.

Figure 3:
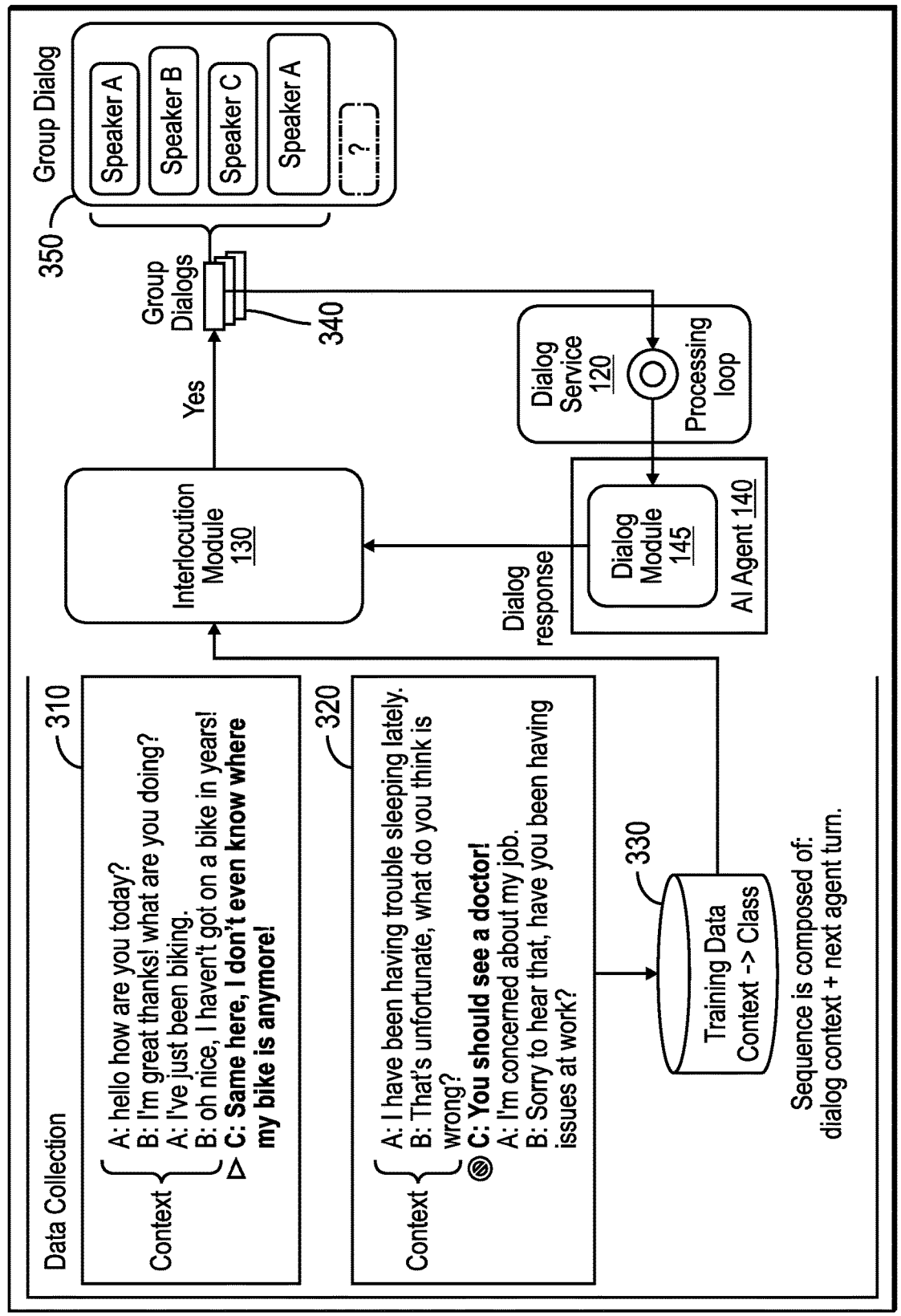
FIG. 3 illustrates an example of AI agent interaction that is dependent on dialog response in accordance with certain embodiments.

FIG. 3 illustrates an example of AI agent 140 interaction that is dependent on dialog response in accordance with certain embodiments. Initially, for data collection, the training data 330 may be extracted from existing human-human group dialogs 310, 320 that are annotated. For example, the group dialog 310 is annotated with an arrow to indicate an appropriate interlocution point in the dialog to participate and add a comment. As another example, the group dialog 320 is annotated with a prohibition sign to indicate it is not an appropriate interlocution point in the dialog to participate and add a comment. In certain embodiments, both interlocution and dialog are modeled, and the annotations also indicate whether the post content is appropriate.

For the training data 330, interlocution may be modeled as a sequence classification task, with each sequence composed of dialog context+a next AI agent turn. In various embodiments, the dialog context may be the entirety of the dialog up to a certain point in time (including persona data and temporal data) or a recent subset of the dialog up to a certain point in time (including persona data and temporal data). Also, in certain embodiments, the next AI agent turn may be a hypothetical dialog response of the AI agent given the dialog context. With embodiments, the dialog context and the hypothetical agent turn are separated because of the format of the inference task. The training data 330 may include examples of dialog context and class. In certain embodiments, the class is a classification code that indicates whether the interlocution is positive or negative.

In certain embodiments, the interlocution module 130 is a statistical model that determines whether the AI agent 140 should post a dialog response (e.g., a comment or a question) to the group dialog. The interlocution module 130 is trained using the training data. In certain embodiments, the interlocution module 130 is a transformer with a classification head, a neural network, etc.

In certain embodiments, the input to the interlocution module 130 is the current dialog context, while the output of the interlocution module 130 is a classification code indicating whether it is an appropriate time to post a dialog response.

In certain embodiments, the inputs to the interlocution module 130 are the current dialog context and a proposed dialog response from the dialog module 145 of the AI agent 140, while the output of the interlocution module 130 is a classification code indicating whether it is an appropriate time to post a dialog response.

In certain embodiments, the input to the interlocution module is the current dialog context, while the output of the interlocution module 10 is either a dialog response (i.e., a dialog turn) or a classification code indicating that a dialog response is not to be introduced in this dialog context.

In this example, the dialog service 120 is monitoring multiple group dialogs 340. The group dialog 350 is for one of the group dialogs 340. In certain embodiments, the group dialogs are stored on a dialog server 170.

In certain embodiments, the processing loop of the dialog service 120 periodically evaluates the active group dialogs 340 for interlocution opportunities. The use of an asynchronous processing loop allows the AI agent to converse outside of a turn based cadence. If interlocution is indicated (e.g., based on determining interlocution at each dialog turn or determining interlocution periodically), then the dialog service 120 triggers the dialog module 145 to produce an AI agent 140 turn and post a dialog response to the group dialog. Thus, with embodiments, dialog is no longer turn based, as it is with dyadic dialog.

The dialog module 145 generates a dialog response based on the other messages in the group dialog and sends the dialog response to the interlocution module 130. The interlocution module 130 determines whether it is an appropriate interlocution point to post the dialog response based on the training data, the current dialog, and the dialog response. If the interlocution module 130 determines that it is an appropriate interlocution point to post the dialog response, then, the interlocution module 130 posts the dialog response to the group dialog. Otherwise, the interlocution module 130 does not post the dialog response.

In certain embodiments, if the interlocution module 130 determines that it is not an appropriate interlocution point to post the dialog response, then the response is discarded and a new dialog response is generated at another point in time. In other embodiments, if the interlocution module 130 determines that it is not an appropriate interlocution point to post the dialog response, the interlocution module 130 stores the dialog response and possibly posts that dialog response later.

Thus, the interlocution module 130 does take the dialog response into account, and interlocution is dependent on the dialog response.

Figure 4:
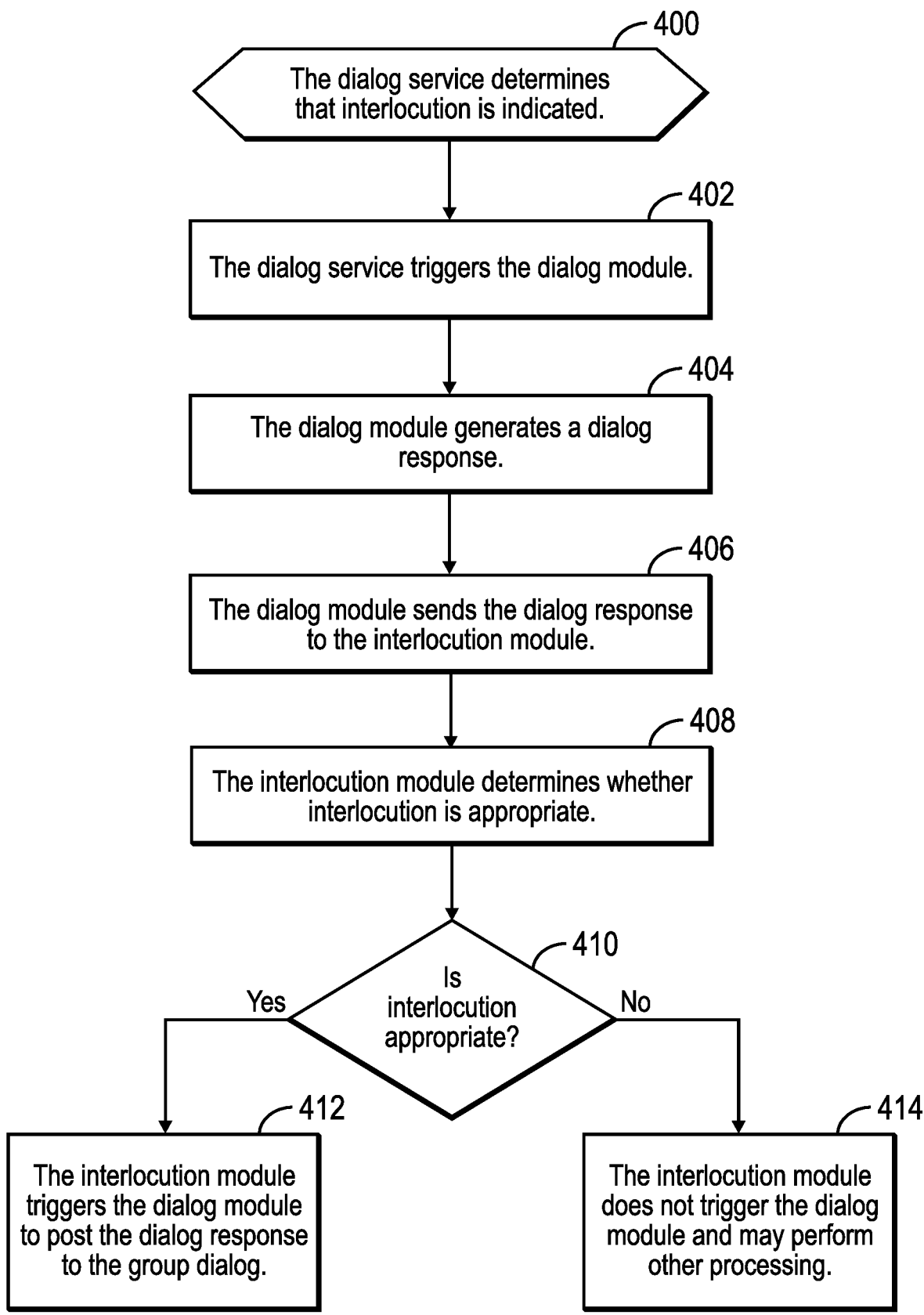
FIG. 4 illustrates, in a flowchart, operations for interlocution that is dependent on dialog response in accordance with certain embodiments.

FIG. 4 illustrates, in a flowchart, operations for interlocution that is dependent on dialog response in accordance with certain embodiments. Control begins at block 400 with the dialog service 120 determining that interlocution is indicated (e.g., based on determining interlocution at each dialog turn or determining interlocution periodically). That is, at block 400 an indication is generated that an interlocution point is to be determined for the group dialog, and this indication is generated at each dialog turn or periodically. In block 402, the dialog service 120 triggers the dialog module 145. In block 404, the dialog module 145 generates a dialog response. In block 406, the dialog module 145 sends the dialog response to the interlocution module 130. In block 408, the interlocution module 130 determines whether interlocution is appropriate. In block 410, if interlocution is appropriate, processing continues to block 412, otherwise, processing continues to block 414. In block 412, the interlocution module 130 triggers the dialog module 145 to post the dialog response to the group dialog. In certain other embodiments, the interlocution module 130 posts the dialog response to the group dialog. In block 414, the interlocution module 130 does not trigger the dialog module 145 and may perform other processing. Because the dialog module 145 is not triggered, the dialog response is not posed to the group dialog.

Figure 5:
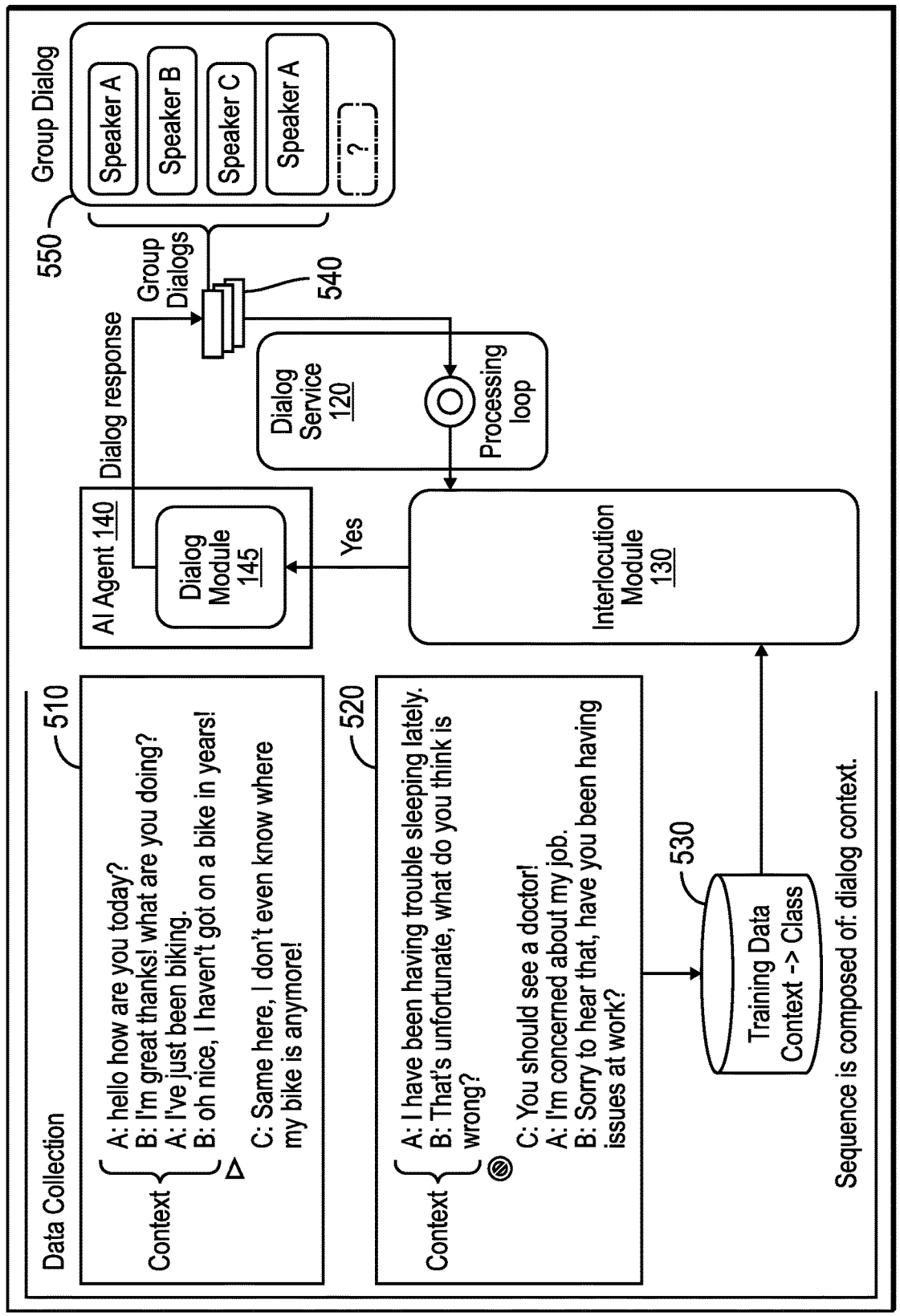
FIG. 5 illustrates an example of AI agent interaction that is independent of dialog response in accordance with certain embodiments.

FIG. 5 illustrates an example of AI agent 140 interaction that is independent of dialog response in accordance with certain embodiments. Initially, for data collection, the training data 530 may be extracted from existing human-human group dialogs 510, 520 that are annotated.

For the training data 530, interlocution may be modeled as a sequence classification task, with each sequence composed of dialog context. The training data 530 may include examples of context and class.

In this example, the dialog service 120 is monitoring multiple group dialogs 540. The group dialog 550 is for one of the group dialogs 540.

In certain embodiments, the dialog service 120 periodically evaluates the active group dialogs 540. If interlocution is indicated, then the dialog service 120 triggers the interlocution module 130. The interlocution module 130 determines whether a dialog response should be generated. If so, the interlocution module 130 triggers the dialog module 145 to generate and post the dialog response. The interlocution module 130 determines whether it is an appropriate interlocution point to post the dialog response based on the training data and the current dialog. Unlike in FIG. 3, the interlocution module 130 does not take the dialog response into account. Thus, interlocution is independent of the dialog response.

The dialog module 145 generates a dialog response based on the other messages in the group dialog and posts the dialog response to the group dialog 550.

The interlocution module 130 determines whether it is an appropriate interlocution point to post the dialog response based on the training data, the current dialog, and the dialog response. If the interlocution module 130 determines that it is an appropriate interlocution point to post the dialog response, then, the interlocution module 130 posts the dialog response to the group dialog. Otherwise, the interlocution module 130 does not post the dialog response.

Figure 6:
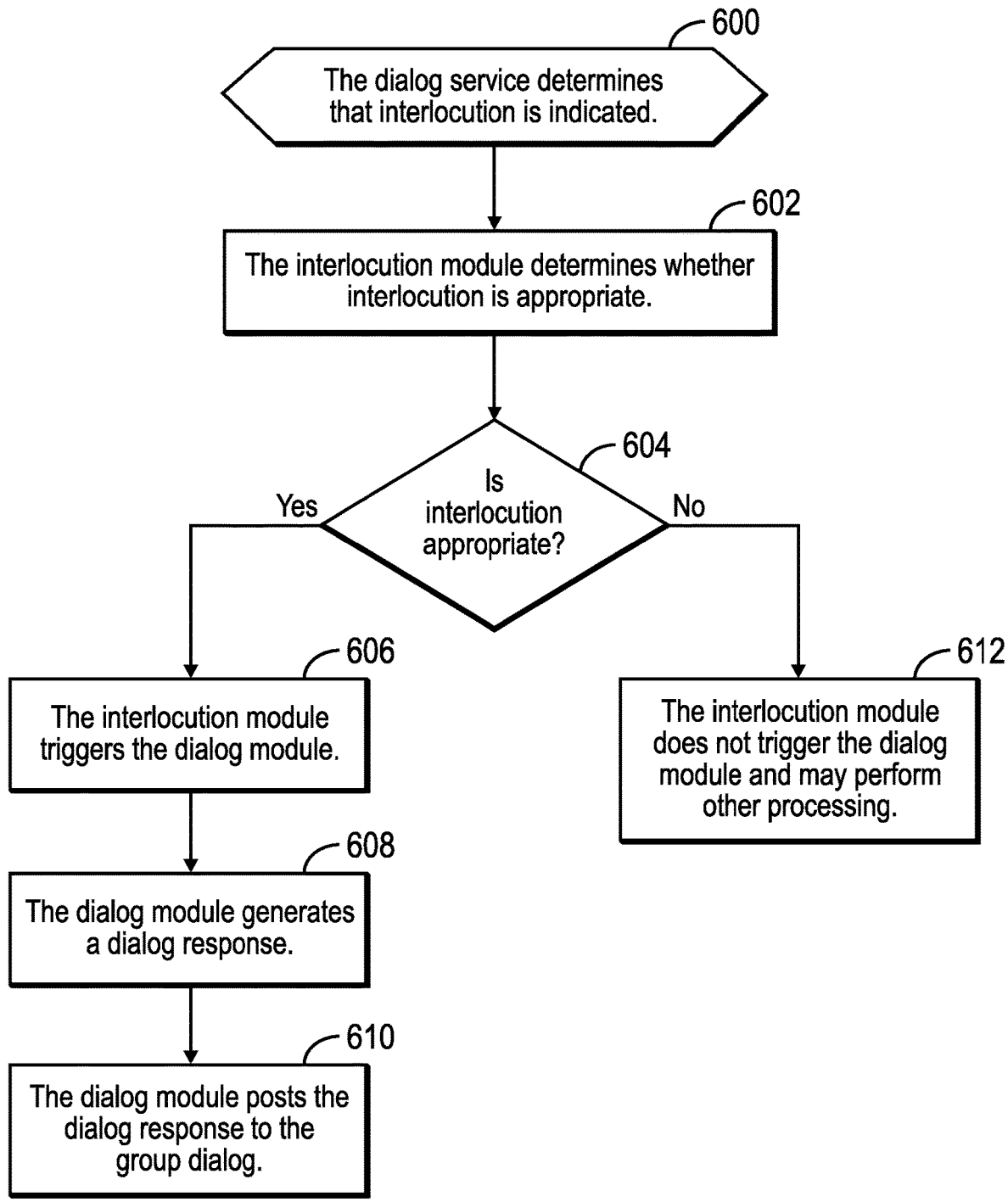
FIG. 6 illustrates, in a flowchart, operations for interlocution that is not dependent on dialog response in accordance with certain embodiments.

FIG. 6 illustrates, in a flowchart, operations for interlocution that is not dependent on dialog response in accordance with certain embodiments. Control begins at block 600 with the dialog service 120 determining that interlocution is indicated (e.g., based on determining interlocution at each dialog turn or determining interlocution periodically). That is, at block 600 an indication is generated that an interlocution point is to be determined for the group dialog, and this indication is generated at each dialog turn or periodically.

In block 602, the interlocution module 130 determines whether interlocution is appropriate. In block 604, if interlocution is appropriate, processing continues to block 606, otherwise, processing continues to block 612. In block 606, the interlocution module 130 triggers the dialog module 145. In block 608, the dialog module 145 generates a dialog response. In block 610, the dialog module 145 posts the dialog response to the group dialog. In block 612, the interlocution module 130 does not trigger the dialog module 145 and may perform other processing. Because the dialog module 145 is not triggered, the dialog response is not posted to the group dialog.

Merely to enhance understanding of embodiments example, use cases are provided herein.

In a first use case, an AI agent 140 is trained to introduce facts relevant to an ongoing discussion (e.g., debate). This is useful to keep the discussion grounded. The dialog system 105 introduces facts at the appropriate interlocution point so as not to stifle discussion. For this first use case, training data is collected by annotating existing discussions/debates or introducing an untrained AI agent 140 into existing discussions and gathering feedback. In this first use case, the annotation task answers the question: "If this a good point to introduce a fact, what fact should be introduced?". The training data is used to model a sequence→classification interlocution task:

Sequence (conversational context+generated fact)

The interlocution module 130 is executed periodically and receives both the conversational context (i.e., a type of dialog context) and the proposed dialog turns (e.g., generated facts) as input. The interlocution module 130 determines whether the generated fact is appropriate within the current dialog context. In certain embodiments, conversational context may be described as a topic and a flow of the dialog.

In a second use case, an AI agent 140 is used to provide mental health support in a group discussion. Training data is collected from existing group dialogs, which include mental health experts. The training data is also collected from existing dialogs that are annotated by mental health experts. The interlocution module 130 is executed periodically and determines whether a dialog response (e.g., support) is appropriate at a given dialog context.

Figure 7:
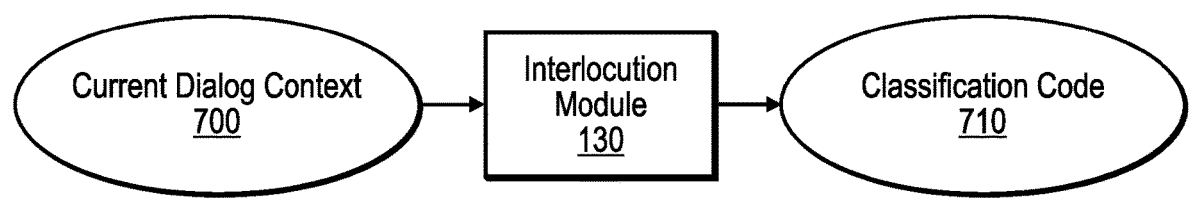
FIG. 7 illustrates that dialog generation is conditional on interlocution decision in accordance with certain embodiments.

FIG. 7 illustrates that dialog generation is conditional on interlocution decision in accordance with certain embodiments. That is, generation of the next dialog turn is conditional on the interlocution decision. In such embodiments, the input 700 to the interlocution module 130 (e.g., a machine learning model) is the current dialog context, while the output 710 of the interlocution module 130 is a classification code indicating whether it is an appropriate interlocution point to post a dialog response.

Figure 8:
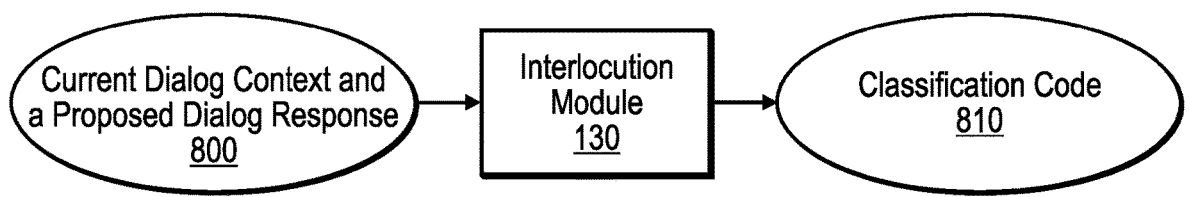
FIG. 8 illustrates that a next dialog response from the AI agent is input to the interlocution module in accordance with certain embodiments.

FIG. 8 illustrates that a next dialog response from the dialog module 145 of the AI agent 140 is input to the interlocution module 130 in accordance with certain embodiments. The interlocution module 130 makes a determination that is dependent on a dialog turn generated by the dialog module 145 of the AI agent 140. In such embodiments, the inputs 800 to the interlocution module 130 (e.g., a machine learning model) are the current dialog context and a proposed dialog response from the dialog module 145 of the AI agent 140, while the output 810 of the interlocution module 130 is a classification code indicating whether it is an appropriate interlocution point to post a dialog response.

Figure 9:
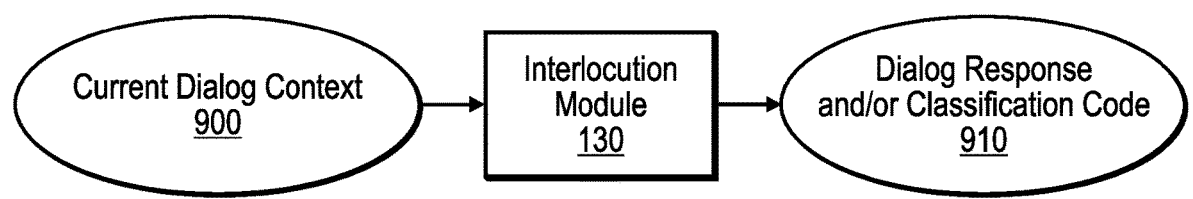
FIG. 9 illustrates that dialog generation and interlocution are modeled together in accordance with certain embodiments.

FIG. 9 illustrates that dialog generation and interlocution are modeled together in accordance with certain embodiments. The interlocution is integrated into the dialog training task itself. In such embodiments, the input 900 to the interlocution module 130 (e.g., a machine learning model) is the current dialog context, while the output 910 of the interlocution module 130 is either a dialog response (i.e., a dialog turn) plus a classification code indicating that the dialog response is to be introduced in this context at this time or a classification code indicating that a dialog response is not to be introduced in this context at this time.

In certain embodiments, interlocution is inferred at each new dialog turn in accordance with certain embodiments. That is, at each dialog turn, an interlocution decision is computed.

In certain embodiments, interlocution is computed periodically. That is, the interlocution decision is computed periodically giving greater flexibility to the AI agent 140.

In certain embodiments, interlocution is computed as an ensemble. In such embodiments, temporal data is modeled independently of dialog context and personas. For example, the temporal decision (which is numerical) is modeled using a first model (e.g., a neural network), while the dialog context decision (which is text based) is modeled using a second model (e.g., a sequence transformer). Then, the outputs of the first model and the second model are used to determine a final decision on interlocution.

In certain embodiments, the AI agent 140 converses privately with one or more members within a group dialog. That is, rather than conversing within the group dialog, the AI agent 140 may privately converse with one or more members of the group privately, and this may be referred to as "whispering". For example, an AI agent 140 that helps participants to be more polite or understanding of each other may "whisper" suggestions to one or more members of the group chat privately (i.e., directly with each of the one or more members).

Figure 10:
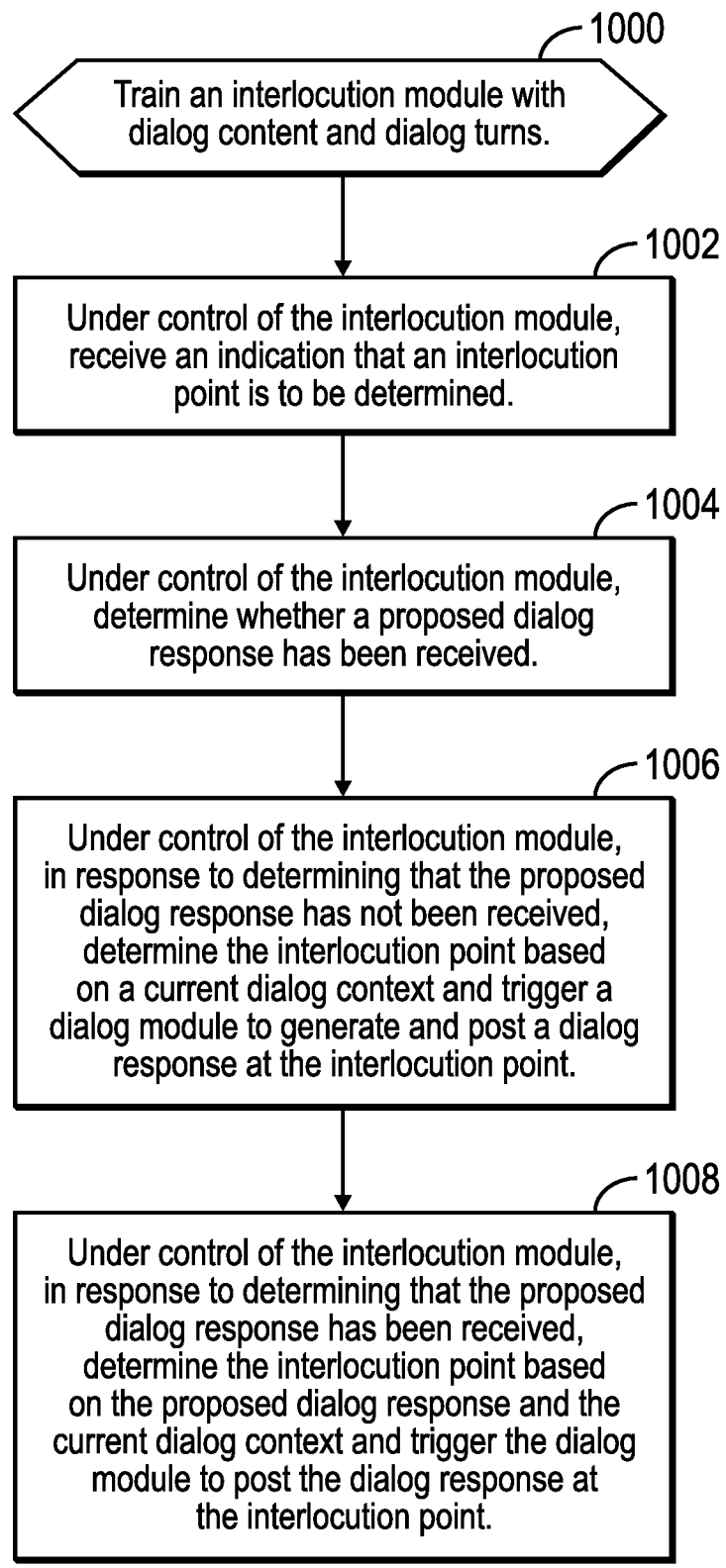
FIG. 10 illustrates, in a flowchart, operations for determining AI agent interlocution in accordance with certain embodiments.

FIG. 10 illustrates, in a flowchart, operations for determining AI agent interlocution in accordance with certain embodiments. Control begins at block 1000 with training of interlocution module with dialog content and dialog turns. In block 1002, under control of the interlocution module, an indication is received that an interlocution point is to be determined. In block 1004, under control of the interlocution module, whether a proposed dialog response has been received is determined. In block 1006, under control of the interlocution module, in response to determining that the proposed dialog response has not been received, the interlocution point is determined based on a current dialog context and a dialog module is triggered to generate and post a dialog response at the interlocution point. In block 1008, under control of the interlocution module, in response to determining that the proposed dialog response has been received, the interlocution point is determined based on the proposed dialog response and the current dialog context and the dialog module is triggered to post the dialog response at the interlocution point.

Figure 11:
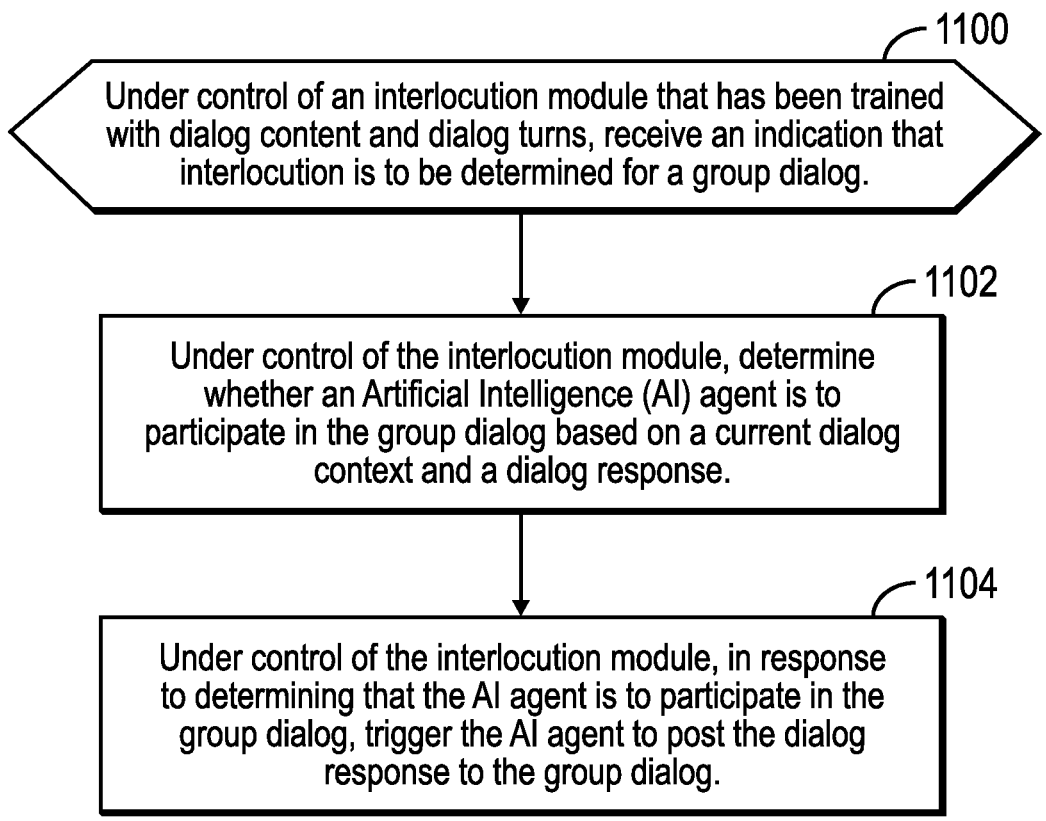
FIG. 11 illustrates, in a flowchart, operations for moderating AI agent interlocution in a group dialog in accordance with certain embodiments.

FIG. 11 illustrates, in a flowchart, operations for moderating AI agent interlocution in a group dialog in accordance with certain embodiments. Control begins at block 1100 with, under control of an interlocution module 130 that has been trained with dialog content and dialog turns, receiving an indication that interlocution is to be determined for a group dialog. In block 1102, under control of the interlocution module 130, it is determined whether an Artificial Intelligence (AI) agent is to participate in the group dialog based on a current dialog context and a dialog response. In block 1104, under control of the interlocution module 130, in response to determining that the AI agent is to participate in the group dialog, the AI agent is triggered to post the dialog response to the group dialog. In addition, in response to determining that the AI agent is not to participate in the group dialog, the interlocution module 130 performs other processing.

Thus, the dialog system 105 determines when an AI agent 140 should post a dialog response in a group dialog. The dialog system 105 considers dialog context, participant personas, and/or temporal information to predict the appropriate interlocution point when interlocution should occur. This is very helpful for N:1, N:N systems where multiple humans interact in dialogs with each other and with AI agents.

With embodiments, users communicate feedback on the AI agent participation in the group dialog through feedback mechanisms. This information is used to further train and refine the dialog system 105.

With embodiments, the dialog system 105 results in a more natural, conversational AI agent that is better suited to the dynamics of group dialogs.

As problem solving and customer support is moving into group dialog environments, which provide greater transparency and scalability, the dialog system 105 enables a more natural integration of AI agents into group dialogs and improves user productivity and satisfaction.

By determining when it is appropriate for the AI agent to post a dialog response, the dialog system 105 allows a conversational AI agent to converse within a group dialog more naturally, rather than being limited to a traditional dialog turn based dialog, such as with a dyadic dialog.

Thus, embodiments moderate AI agent interlocution in a group dialog environment by annotating existing dialog to indicate one or more positive and one or more negative interlocution points, training an interlocution module 130 (which is a statistical model) based on the annotated existing conversational (e.g., a type of dialog) data, and monitoring, by the interlocution module 130, one or more conversation instances (i.e., dialog instances), where the one or more conversation instances are one or more dialog turns. A dialog module 145 generates a dialog response for a conversation instance of the one or more conversation instances. The interlocution module infers an interlocution point within a conversation instance of the one or more of the conversation instances, producing an AI agent 140 turn. The dialog module 145 inserts the dialog response into the conversation instance of the one or more conversation instances during the AI agent 140 turn.

In certain embodiments, the existing conversational data is an ordered sequence of one or more dialog turns, where the one or more dialog turns are labeled with one or more personas. In certain embodiments, the existing conversational data are one or more salient facts associated with the one or more personas.

In certain embodiments, the existing conversational data are temporal data selected from a list consisting of: duration of dialog, time since last dialog response, and average response time.

In certain embodiments, the existing conversational data comprises one or more conversations between two or more human users.

In certain embodiments, the monitoring is performed at the one or more dialog turns. In certain embodiments, the monitoring is performed at regular intervals. In certain embodiments, the monitoring is implemented using an event loop.

In certain embodiments, the generating by the dialog module is gated by the interlocution module.

In certain embodiments, the interlocution module 130 comprises a transformer, and a classification head or a language modeling (LM) head.

In certain embodiments, the AI agent 140 turn is asynchronous with respect to the one or more dialog turns.

In certain embodiments, one or more positive emotes or one or more negative emotes from the conversational data are used as feedback in improving the accuracy of the model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 12:
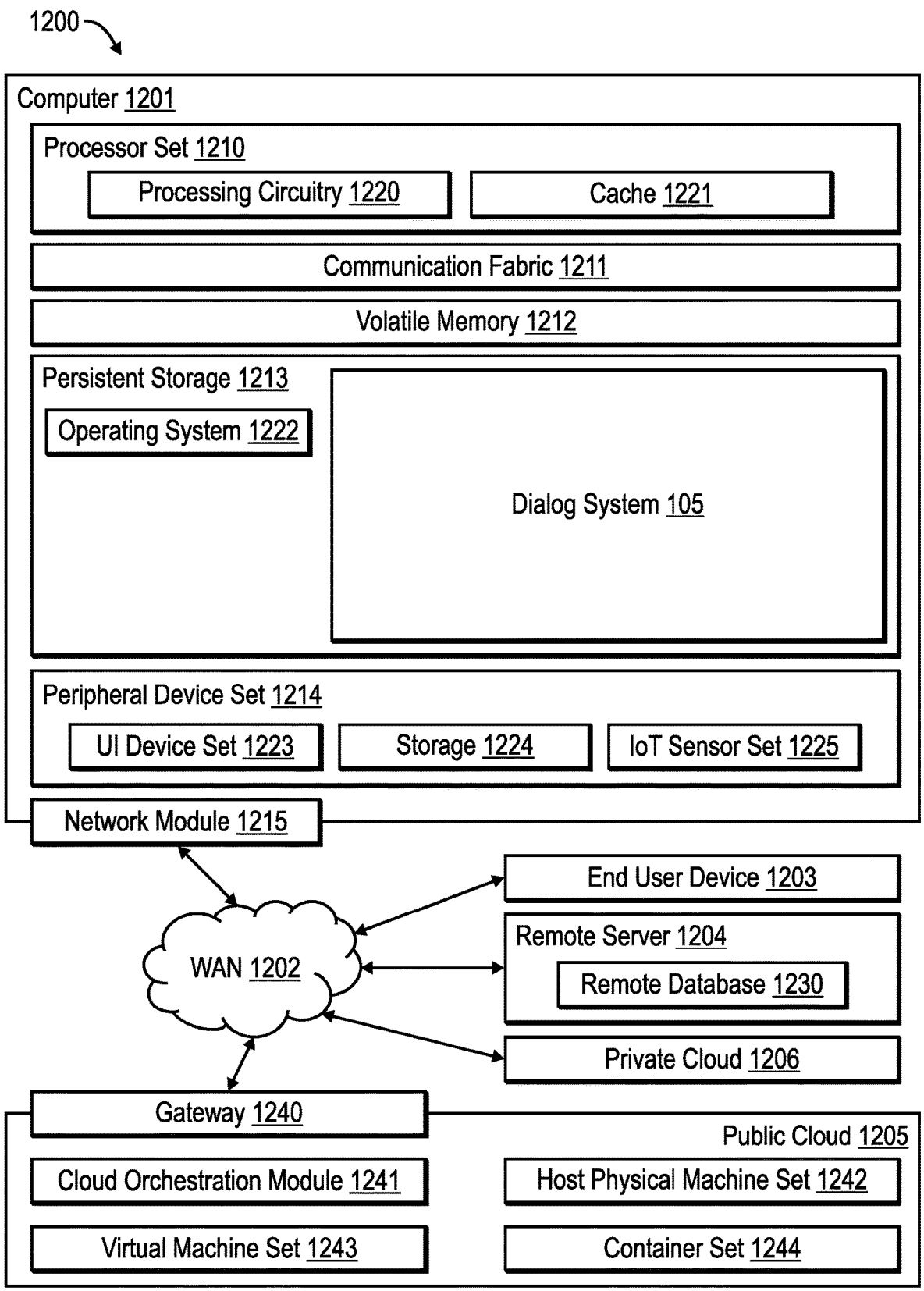
FIG. 12 illustrates a computing environment in accordance with certain embodiments.

FIG. 12 illustrates a computing environment 1200 in accordance with certain embodiments. Computing environment 1200 contains an example of an environment for the execution of at least some of the computer code involved in performing the inventive methods, such as dialog system 105. In addition to block 105, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1230 and cache 1221), communication fabric 1211, volatile memory 1212, persistent storage 1213 (including operating system 1222 and block 105, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1230 may be distributed over multiple packages, for example, multiple, coordinated integrated circuit chips. Processing circuitry 1230 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 105 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid state storage devices. Operating system 1222 may take several forms, such as various known proprietary operating systems or open source Portable Operating System Interface-type operating systems that employ a kernel. The code included in block 105 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    during a group dialog with an Artificial Intelligence (AI) agent and at least two users,
        under control of an interlocution module that has been trained with dialog content and dialog turns,
            receiving an indication that an interlocution point is to be determined for the group dialog;
            determining the interlocution point at which the AI agent is to participate in the group dialog based on a current dialog context and a dialog response; and
            triggering the AI agent to post the dialog response to the group dialog at the interlocution point;
            receiving feedback comprising a positive emote or a negative emote for the dialog response; and
            further training the interlocution module based on the received feedback.

2. The computer-implemented method of claim 1, further comprising operations for:
    receiving another indication that interlocution is to be determined for the group dialog;
    determining that the AI agent is to participate in the group dialog based on a new current dialog context; and
    generating a new dialog response.

3. The computer-implemented method of claim 1, wherein the dialog content and the dialog turns are annotated with persona data and temporal data, and wherein the temporal data comprises a duration, a time since a last response, and an average response time.

4. The computer-implemented method of claim 1, wherein the dialog content is annotated with one or more positive interlocution points and one or more negative interlocution points.

5. The computer-implemented method of claim 1, wherein the indication that the interlocution point is to be determined is generated at each dialog turn in the group dialog.

6. The computer-implemented method of claim 1, wherein the indication that that the interlocution point is to be determined is generated periodically.

7. A computer program product, the computer program product comprising a computer readable storage medium having program instructions embodied therewith, the program instructions executable by a processor to cause the processor to perform operations for:
    during a group dialog with an Artificial Intelligence (AI) agent and at least two users,
        under control of an interlocution module that has been trained with dialog content and dialog turns,
            receiving an indication that an interlocution point is to be determined for the group dialog;
            determining the interlocution point at which the AI agent is to participate in the group dialog based on a current dialog context and a dialog response; and
            triggering the AI agent to post the dialog response to the group dialog at the interlocution point;
            receiving feedback comprising a positive emote or a negative emote for the dialog response; and
            further training the interlocution module based on the received feedback.

8. The computer program product of claim 7, wherein the program instructions are executable by the processor to cause the processor to perform further operations for:
    receiving another indication that interlocution is to be determined for the group dialog;
    determining that the AI agent is to participate in the group dialog based on a new current dialog context; and
    generating a new dialog response.

9. The computer program product of claim 8, wherein the dialog content and the dialog turns are annotated with persona data and temporal data, and wherein the temporal data comprises a duration, a time since a last response, and an average response time.

10. The computer program product of claim 7, wherein the dialog content is annotated with one or more positive interlocution points and one or more negative interlocution points.

11. The computer program product of claim 7, wherein the indication that the interlocution point is to be determined is generated at each dialog turn in the group dialog.

12. The computer program product of claim 7, wherein the indication that that the interlocution point is to be determined is generated periodically.

13. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
during a group dialog with an Artificial Intelligence (AI) agent and at least two users,
    under control of an interlocution module that has been trained with dialog content and dialog turns, receiving an indication that an interlocution point is to be determined for the group dialog;

determining the interlocution point at which the AI agent is to participate in the group dialog based on a current dialog context and a dialog response; and triggering the AI agent to post the dialog response to the group dialog at the interlocution point;

receiving feedback comprising a positive emote or a negative emote for the dialog response; and further training the interlocution module based on the received feedback.

14. The computer system of claim 13, wherein the operations further comprise:

receiving another indication that interlocution is to be determined for the group dialog;

determining that the AI agent is to participate in the group dialog based on a new current dialog context; and generating a new dialog response.

15. The computer system of claim 14, wherein the dialog content and the dialog turns are annotated with persona data and temporal data, and wherein the temporal data comprises a duration, a time since a last response, and an average response time.

16. The computer system of claim 13, wherein the dialog content is annotated with one or more positive interlocution points and one or more negative interlocution points.

17. The computer system of claim 13, wherein the indication that the interlocution point is to be determined is generated at each dialog turn in the group dialog.

18. The computer system of claim 13, wherein the indication that that the interlocution point is to be determined is generated periodically.

* * * * *